(12) United States Patent
Liu et al.

(10) Patent No.: US 10,160,141 B2
(45) Date of Patent: Dec. 25, 2018

(54) MOLDS FOR MAKING CONTACT LENSES

(71) Applicant: Novartis AG, Basel (CH)

(72) Inventors: Alice Weimin Liu, Alpharetta, GA (US); Gregory L. Herron, Sugar Hill, GA (US)

(73) Assignee: Novartis AG, Basel (CH)

( * ) Notice: Subject to any disclaimer, the term of this patent is extended or adjusted under 35 U.S.C. 154(b) by 248 days.

(21) Appl. No.: 14/941,716

(22) Filed: Nov. 16, 2015

(65) Prior Publication Data

US 2016/0144534 A1 May 26, 2016

Related U.S. Application Data

(60) Provisional application No. 62/084,129, filed on Nov. 25, 2014.

(51) Int. Cl.
*B29D 11/00* (2006.01)
*B29C 33/38* (2006.01)

(52) U.S. Cl.
CPC ............ *B29C 33/38* (2013.01); *B29D 11/005* (2013.01); *B29D 11/00134* (2013.01); *B29K 2881/00* (2013.01); *B29K 2995/0031* (2013.01)

(58) Field of Classification Search
CPC .. B29D 11/00134; B29D 11/005; B29C 33/38
See application file for complete search history.

(56) References Cited

U.S. PATENT DOCUMENTS

| 3,931,373 | A | * | 1/1976 | Beattie | B29C 33/405 |
| | | | | | 264/2.3 |
| 4,121,896 | A | * | 10/1978 | Shepherd | B29C 33/0038 |
| | | | | | 425/412 |
| 4,284,591 | A | * | 8/1981 | Neefe | B29C 43/54 |
| | | | | | 264/1.1 |
| 5,508,317 | A | | 4/1996 | Müller | |
| 5,583,163 | A | | 12/1996 | Möller | |
| 5,665,840 | A | | 9/1997 | Poehlmann | |
| 5,712,356 | A | | 1/1998 | Bothe | |
| 5,849,841 | A | | 12/1998 | Mühlebach | |
| 5,908,876 | A | * | 6/1999 | Fujii | C08F 283/006 |
| | | | | | 359/642 |
| 6,039,913 | A | | 3/2000 | Hirt | |
| 6,165,408 | A | | 12/2000 | Steinmann | |

(Continued)

FOREIGN PATENT DOCUMENTS

EP 367513 A2 5/1990
WO 87/04390 A1 7/1987

*Primary Examiner* — Mathieu D Vargot
(74) *Attorney, Agent, or Firm* — Sheng-Hsin Hu

(57) ABSTRACT

The present invention general related to a mold for making a contact lens comprises a first mold half having a first mold surface in contact with a polymerizable and/or crosslinkable silicone containing lens forming composition and a second mold half having a second mold surface in contact with the lens-forming composition, and the first mold half and the second mold half are configured to receive each other such that a cavity is formed between the first mold surface and the second mold surface. The cavity defines the shape of a contact lens to be molded. At least one of the mold halves is made from a sulfur containing polymer having a refraction index greater than 1.5. The dimension stability of the plastic mold can be improved.

10 Claims, 2 Drawing Sheets

(56) References Cited

U.S. PATENT DOCUMENTS

| | | | |
|---|---|---|---|
| 6,221,303 | B1 | 4/2001 | Steinmann |
| 6,303,687 | B1 | 10/2001 | Mueller |
| 6,472,489 | B1 | 10/2002 | Stockinger |
| 6,479,587 | B1 | 11/2002 | Stockinger |
| 6,492,478 | B1 | 12/2002 | Steinmann |
| 6,627,124 | B1 | 9/2003 | Herbrechtsmeier |
| 6,800,225 | B1 | 10/2004 | Hagmann |
| 7,091,283 | B2 | 8/2006 | Müller |
| 7,238,750 | B2 | 7/2007 | Müller |
| 7,244,808 | B2 | 7/2007 | Tanaka |
| 7,268,189 | B2 | 9/2007 | Müller |
| 7,384,590 | B2 | 6/2008 | Kelly |
| 7,387,759 | B2 | 6/2008 | Kelly |
| 7,396,900 | B2 | 7/2008 | Tanaka |
| 7,521,519 | B1 | 4/2009 | Hirt |
| 7,845,615 | B2 | 12/2010 | Hagmann |
| 8,003,710 | B2 | 8/2011 | Medina |
| 8,071,658 | B2 | 12/2011 | Zhou |
| 8,071,703 | B2 | 12/2011 | Zhou |
| 8,088,313 | B2 | 1/2012 | Hagmann |
| 8,404,783 | B2 | 3/2013 | Chang |
| 8,524,800 | B2 | 9/2013 | Phelan |
| 2004/0082680 | A1 | 4/2004 | Phelan |
| 2004/0207105 | A1* | 10/2004 | Altmann ............... B29C 33/40 264/1.36 |
| 2005/0113549 | A1 | 5/2005 | Devlin |
| 2012/0157651 | A1 | 6/2012 | Chen |

* cited by examiner

MOLDS FOR MAKING CONTACT LENSES

This application claims the benefit under 35 USC § 119(e) of U.S. provisional application Ser. No. 62/084,129 filed Nov. 25, 2014, incorporated herein by reference in its entirety.

BACKGROUND

The invention relates to a process for the preparation of mouldings, especially optical lenses and in particular contact lenses, to a corresponding device for the preparation of mouldings, and to the mouldings that have been prepared or are obtainable by the process or using the device, especially optical lenses and in particular contact lenses, in accordance with the preamble of each independent patent claim.

Contact lenses, which are to be manufactured economically in large unit numbers, are preferably manufactured by the so-called mould or full-mould process. In these processes, the lenses are manufactured into their final shape between two moulds, so that there is no need to subsequently finish the surfaces of the lenses, nor to finish the edges. Such moulds consist of a female mould half and a male mould half, the cavity being formed between the two mould halves defining the shape of the moulding. Mould processes are described for example in PCT application no. WO/87/04390 or in European patent application EP-A-0 367 513.

In these known mould processes, the geometry of the contact lenses to be manufactured is defined by the mould cavity. The edge of the contact lens is likewise formed by the mould which normally consists of two mould halves. The geometry of the edge is defined by the contour of the two mould halves in the area in which they touch one another.

To prepare a contact lens, first of all a certain amount of a flowable starting material is placed in the female mould half. Afterwards, the mould is closed by placing the male mould half thereon. Normally, a surplus of starting material is used, so that, when the mould is closed, the excess amount is expelled into an overflow area outwardly adjacent to the mould cavity. The subsequent polymerisation or crosslinking of the starting material takes place by radiation with UV light, or by heat action, or by another non-thermal method. Both the starting material in the mould cavity and the excess material in the overflow area are thereby hardened. In order to obtain error-free separation of the contact lens from the excess material, a good seal or expulsion of the excess material must be achieved in the contact zone of the two mould halves. Only in this way can error-free contact lens edges be obtained.

The contact lenses produced in this manner are moulded parts having little mechanical stability and a water content of more than 60% by weight. After manufacture, the lens is inspected, then packed and subjected to heat sterilisation at 121° C. in an autoclave.

The materials used for these moulds are preferably plastics, e.g. polypropylene. The moulds are produced by injection moulding and are only used once. This is because, among other things, the moulds are partially contaminated by the surplus material, are damaged when the contact lens is separated or are irreversibly deformed in partial areas when the mould is closed. In particular, because of the quality requirements of the contact lenses edges, the moulds are only used once, since a certain amount of deformation of the moulds at the area of their edge cannot be excluded with certainty.

In U.S. Pat. No. 5,508,317, a new contact lens material is described, which represents an important improvement in the chemistry of polymerisable starting materials for the manufacture of contact lenses. The patent discloses a water-soluble composition of a prepolymer, which is filled into the mould cavity and then crosslinked photochemically. Since the prepolymer has several crosslinkable groups, the crosslinking is characterised by its high quality, so that a finished lens of optical quality can be produced within a few seconds, without the necessity for subsequent extraction or reworking steps. Owing to the improved chemistry of the starting material as illustrated in the patent, contact lenses can be produced at considerably lower cost, so that in this way it is possible to produce disposable lenses that are used only once.

EP-A-0 637 490 describes a process by means of which a further improvement may be obtained in the preparation process of contact lenses with the prepolymer described in U.S. Pat. No. 5,508,317, a derivative of a polyvinyl alcohol having a molecular weight of at least about 2,000 that, based on the number of hydroxy groups of the polyvinyl alcohol. Here, the material is filled into a mould comprising two halves, whereby the two mould halves do not touch, but a thin circular gap is located between them. The gap is linked to the mould cavity, so that surplus lens material can flow away into the gap. Crosslinking of the prepolymer takes place by radiation especially with UV light, whereby radiation is restricted to the mould cavity by a chromium mask. In this way, only the material in the mould cavity is crosslinked, so that there is high reproducibility of the edges of the lens without closing the two mould halves.

In this process, instead of the polypropylene moulds that may be used only once, reusable quartz/glass moulds are used. In addition, quartz is notable for its good UV permeability and is very hard and refractory.

However, moulds made from quartz or glass are very expensive to produce, so that owing to the high costs, the moulds ought to have quite long service life in order to ensure that the process is economical. Therefore, for economic reasons, only a limited number of variants can be realised during lens design and prototyping phase, for example in respect of the dioptre number.

In order to solve this problem, the intended objective is to replace at least one of the two mould halves, especially the female mould half, with a mould half consisting of plastic, and thus to employ one mould half made of plastic in combination with one mould half made of quartz or glass.

U.S. Pat. No. 7,845,615 has disclosed CR-39® (diallyl diglycol carbonate polymer) from PPG Industries could be employed as one mold half in combination with one mold half made of quartz or glass. Unfortunately, some issues such as dimensional stability over time, and mold cleaning were reported during the use of CR-39® as mold materials in the LightStream platform.

Therefore, there is still a need for new reusable molds for front curve mold that can be produced using single point diamond turning that is cost effective and short lead time while providing dimensional stability.

SUMMARY OF THE INVENTION

The invention, in one respect, relates to a mold for making a contact lens, comprising a first mold half having a first mold surface in contact with a silicone containing lens forming composition and a second mold half having a second mold surface in contact with the lens-forming composition, wherein the first mold half and the second mold half are configured to receive each other such that a cavity is formed between the first mold surface and the second mold surface, wherein the cavity defines the shape of a contact lens to be molded, wherein the lens forming composition is polymerizable and/or crosslinkable by actinic radiation or thermal energy, wherein at least one of the mold halves is made from a sulfur containing polymer having a refraction index greater than 1.5

The invention, in another respect, relates to a method for producing a contact lens, comprising: the steps of:

(1) providing a contact lens mold, wherein the mold comprising a first mold half having a first mold and a second mold half having a second mold surface, wherein the first mold half and the second mold half are configured to receive each other such that a cavity is formed between the first mold surface and the second mold surface, wherein the cavity defines the shape of a contact lens to be molded, wherein at least one of the mold halves is made from a sulfur containing polymer having a refraction index greater than 1.5,
(2) introducing a lens-forming composition into the cavity formed by the first and second molding surfaces, material, wherein the lens-forming material is crosslinkable and/or polymerizable by actinic radiation or thermal energy;
(3) crosslinking/polymerizing the lens-forming material in the mold to form a lens having a polymer matrix;
(4) opening the mold and removing the formed contact lens from the mold.

DETAILED DESCRIPTION OF EMBODIMENTS OF THE INVENTION

Figure 1:
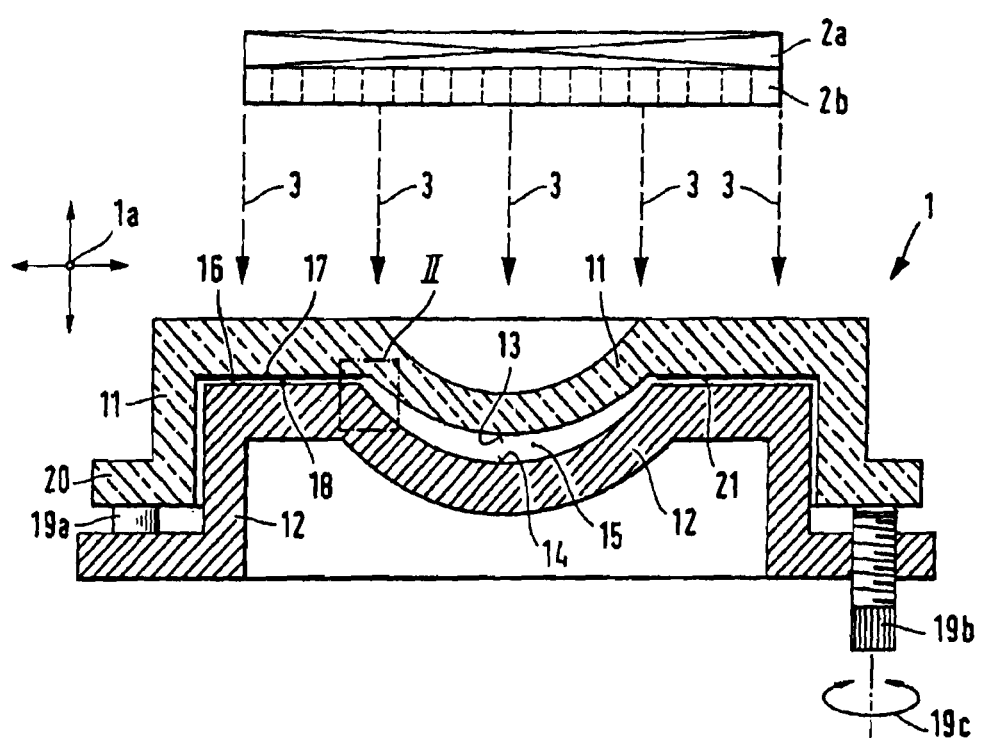
FIG. 1 shows a section through an exemplary embodiment of a casting mold according to the invention in the closed position.

Unless defined otherwise, all technical and scientific terms used herein have the same meaning as commonly understood by one of ordinary skill in the art to which this invention belongs. Generally, the nomenclature used herein and the laboratory procedures are well known and commonly employed in the art. Conventional methods are used for these procedures, such as those provided in the art and various general references. Where a term is provided in the singular, the inventors also contemplate the plural of that term. The nomenclature used herein and the laboratory procedures described below are those well-known and commonly employed in the art. As employed throughout the disclosure, the following terms, unless otherwise indicated, shall be understood to have the following meanings "Quartz" refers to the second most abundant mineral in the Earth's continental crust, after feldspar. It is made up of a continuous framework of $SiO_4$ silicon-oxygen tetrahedra, with each oxygen being shared between two tetrahedra, giving an overall formula $SiO_2$.

"High refraction index polymer" (HRIP) refers to a polymer that has a refractive index greater than 1.5.

"CR-39®" refers to a diallyl diglycol carbonate polymer from PPG Industries and CR-39 has a refraction index 1.498.

"An optical quality surface" refers to a surface has a surface roughness less than 30 nm, preferably less than 20 nm, most preferably less than 10 nm.

"About" as used herein means that a number referred to as "about" comprises the recited number plus or minus 1-10% of that recited number.

"Optional" or "optionally" means that the subsequently described event or circumstance can or cannot occur, and that the description includes instances where the event or circumstance occurs and instances where it does not.

An "ophthalmic lens" refers to a contact lens and/or an intraocular lens. A "contact lens" refers to a structure that can be placed on or within a wearer's eye. A contact lens can correct, improve, or alter a user's eyesight, but that need not be the case. A "silicone hydrogel contact lens" refers to a contact lens comprising a silicone hydrogel material.

As used in this application, the term "hydrogel" or "hydrogel material" refers to a crosslinked polymeric material which is not water-soluble and can contains at least 10% by weight of water within its polymer matrix when fully hydrated.

A "silicone hydrogel" refers to a hydrogel containing silicone. A silicone hydrogel typically is obtained by copolymerization of a polymerizable composition comprising at least one silicone-containing vinylic monomer or at least one silicone-containing vinylic macromer or at least one silicone-containing prepolymer having ethylenically unsaturated groups.

A "vinylic monomer" refers to a compound that has one sole ethylenically-unsaturated group.

The term "olefinically unsaturated group" or "ethylenically unsaturated group" is employed herein in a broad sense and is intended to encompass any groups containing at least one >C=C< group.

A "spatial limitation of actinic radiation" refers to an act or process in which energy radiation in the form of rays is directed by, for example, a mask or screen or combinations thereof, to impinge, in a spatially restricted manner, onto an area having a well-defined peripheral boundary. A spatial limitation of UV radiation is obtained by using a mask or screen having a radiation (e.g., UV and/or visible light) permeable region, a radiation (e.g., UV and/or visible light) impermeable region surrounding the radiation-permeable region, and a projection contour which is the boundary between the radiation-impermeable and radiation-permeable regions, as schematically illustrated in the drawings of U.S. Pat. No. 6,800,225 (FIGS. 1-11), and U.S. Pat. No. 6,627,124 (FIGS. 1-9), U.S. Pat. No. 7,384,590 (FIGS. 1-6), and U.S. Pat. No. 7,387,759 (FIGS. 1-6), all of which are incorporated by reference in their entireties. The mask or screen allows to spatially projects a beam of radiation (e.g., UV radiation and/or visible radiation) having a cross-sectional profile defined by the projection contour of the mask or screen. The projected beam of radiation (e.g., UV radiation and/or visible radiation) limits radiation impinging on a lens formulation located in the path of the projected beam from the first molding surface to the second molding surface of a mold. The resultant contact lens comprises an anterior surface defined by the first molding surface, an opposite posterior surface defined by the second molding surface, and a lens edge defined by the sectional profile of the projected UV and/or visible beam (i.e., a spatial limitation of radiation). The radiation used for the crosslinking is radiation energy, especially UV radiation (and/or visible radiation), gamma radiation, electron radiation or thermal radiation, the radiation energy preferably being in the form of a substantially parallel beam in order on the one hand to achieve good restriction and on the other hand efficient use of the energy.

A "lens-forming material" refers to a material which can be polymerized and/or crosslinked by actinic radiation to form a contact lens.

Actinic radiation refers to radiation of a suitable form of energy. Examples of actinic radiation includes without limitation light radiation (e.g., UV radiation), gamma radiation, electron radiation, X-ray irradiation, microwave irradiation, thermal radiation and the like.

Further aspects and advantages of the process according to the invention and of the device according to the invention will be seen from the description that follows, in conjunction with the drawings.

The device shown in FIG. 1 is designed for the manufacture of contact lenses from a liquid starting material which may be polymerized or crosslinked by UV radiation. It comprises a mold 1 and an energy source 2a, here a UV light source, as well as means 2b for directing the energy provided by the energy source 2a to the mold in the form of an essentially parallel beam. Of course, the energy source 2a and means 2b can also be combined to form a single unit.

The mold consists of two mold halves 11 and 12, each having a curved mold surface 13 and 14 which together define a mold cavity 15, which in turn determines the shape of the contact lens to be manufactured. The mold surface 13 of the upper mold half 11 in the drawing is convex and determines the rear and base surface of the contact lens with the connected edge area; this mold half is normally called the father mold half. Conversely, the mold surface 14 of the other mold half, which is correspondingly called the mother mold half, is concave and determines the front face of the contact lens to be manufactured, likewise with the connected edge area.

The mold cavity 15 is not completely and tightly closed, but in the embodiment illustrated is open around its peripheral edge which defines the edge of the contact lens to be manufactured, and is linked to a relatively narrow annular gap 16. The annular gap 16 is limited or formed by a flat mold wall 17 and 18 on each of the father mold half 11 and the mother mold half 12. In order to prevent complete closure of the mold, spacers, for example in the form of several bolts 19a or 19b, are provided on the mother mold 12, and these interact with a collar or flange 20 of the father mold 11 and keep the two mold halves at such a distance apart that the said annular gap 16 results. As is indicated symbolically in FIG. 1 by the right-hand spacer bolt 19b with a thread, the spacers may also be of adjustable or spring-action formation. In this way, the two mold halves 11, 12 can be moved towards one another during the crosslinking process to balance out leakage, by adjusting the spacers (indicated symbolically by the arrow 19c showing the direction of rotation) or against a spring action. Of course, the mold can be opened and closed in the usual manner, for example by means of a closure unit which is indicated here only by the arrow symbol 1a. Adjustment of the gap between the two mold halves 11, 12 to balance out leakage, may also be effected e.g. using this external closure unit.

It is also conceivable that, instead of the continuous annular gap 16 and the spacers 19a and 19b, a series of segmentous gaps may be provided, the intermediate areas between the individual segment gaps taking over the function of the spacers. Of course, other configurations of mold halves are also conceivable.

On the mold wall 17 in the area of the annular gap 16, there is a mask 21 which is impermeable to the energy form employed, here this is UV light, (or a mask which at least has poor permeability compared with the permeability of the mold), and this mask extends right to the mold cavity 15, and with the exception of the same, screens all the other parts, hollow spaces or areas of the mold 1 that are in contact with or may come into contact with the liquid, uncrosslinked, possibly excess material, from the radiated energy. Partial areas of the lens edge are therefore formed not by a limitation of the material by mold walls, but by a spatial limitation of the radiation or other forms of energy triggering polymerization or crosslinking.

In the case of UV light, the mask 21 may be preferably a chromium layer, that can be produced by processes known e.g. from photography or UV-lithography. The mask 21 does not necessary have to be fixed; it may also be, for example, removable or exchangeable.

Figure 2:
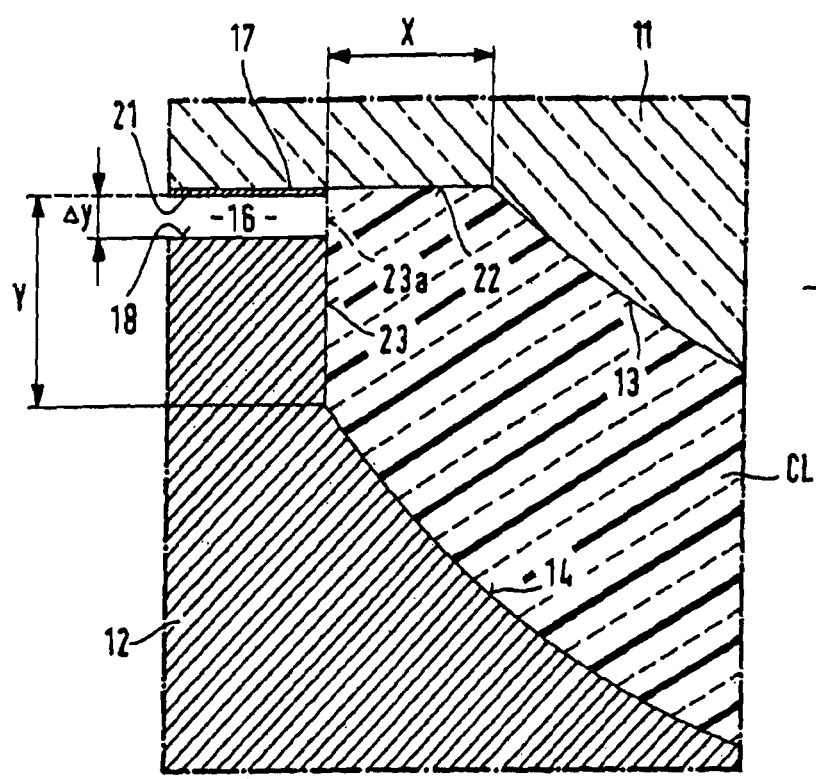
FIG. 2 is a detail, indicated by II in FIG. 1, on a greatly enlarged scale.

FIG. 2 shows the arrangement of the mold 1 in the transition region between the mold cavity 15 and the annular channel 16 as an enlarged detail. The cavity 15 has here, by way of example, a shape that corresponds to the typical rim geometry of a so-called soft contact lens CL. The cavity rim, and thus the lens rim, is formed here by two wall faces 22 and 23 which are arranged at right angles to one another and are arranged on the male and on the female mold halves 11 and 12 respectively. The width and the height of those two wall faces, and of the rim areas of the contact lens defined by them, are indicated by X and Y respectively. Obviously, the lens rim may in practice also be slightly rounded.

As can be seen clearly, the cylindrical wall face 23 of the female mold half 12 does not extend right up to the flat wall face 22 and the wall face 17, lying seamlessly adjacent thereto, of the male mold half 11, but is lower by the amount Δy, so that the annular gap 16 already mentioned, between the wall face 17 and the wall face 18 of the two mold halves 11 and 12, is formed or remains open.

The mask 21 provided on the wall face 17 of the male mold half 11 in this example embodiment extends horizontally exactly up to the extension 23a of the wall face. 23 of the female mold half 12. If the UV light, in the form of a parallel beam 3 causing the crosslinking, is incident at right angles to the wall face 22 and 17 and parallel to the cylindrical wall face 23, the space located at right angles below the mask 21 is in shadow and only the material located inside the cavity 15, that is inside the imaginary wall extension 23a, is crosslinked, resulting in a clean and burr-free lens rim which does not require any subsequent mechanical processing. If parallel energy radiation is used, therefore, disregarding the diffraction and scattering effects, which are usually negligible in practice, the contour of the mask 21 is transferred two-dimensionally parallel and (in this case) downwards into the rim area of the contact lens. Therefore, if the two mold halves 11 and 12 are separated from one another by the annular gap 16 of height Δy, the rim is formed towards the outside of the area resulting from that displacement by means of the spatial restriction of the energy radiation.

In general, the invention, in one respect, is directed to a mold for making a contact lens, comprising a first mold half having a first mold surface in contact with a silicone containing lens forming composition and a second mold half having a second mold surface in contact with the lens-forming composition, wherein the first mold half and the second mold half are configured to receive each other such that a cavity is formed between the first mold surface and the second mold surface, wherein the cavity defines the shape of a contact lens to be molded, wherein the lens forming composition is polymerizable and/or crosslinkable by actinic radiation or thermal energy, wherein at least one of the mold halves comprises a sulfur containing polymer having a refraction index greater than 1.5.

The invention is partly based on the discovery that through the choice of polymers for the production of plastic mold halves, which contains a high refractive index polymer which contains sulfur and has a refraction index greater than 1.5, the dimension stability of the plastic mold can be improved.

High refractive indices have been achieved either by introducing substituents with high molar refractions (intrinsic HRIPs). Typical intrinsic HRIPs are polymers with sulfur-rich. Sulfur-containing substituents including linear thioether and sulfone, cyclic thiophene, thiadiazole and thianthrene are the most commonly used groups for increasing refractive index of a polymer. Polymers with sulfur-rich thianthrene and tetrathiaanthracene moieties exhibit n values above 1.72, depending on the degree of molecular packing.

According to the present invention, any polymer contains sulfur and has a refraction index no less than 1.5 can be used as a mold making material. The preferred polymers are thiourethane and episulfide. Episulfides are a class of organic compounds that contain a saturated heterocyclic ring consisting of two carbon atoms and one sulfur atom. It is the sulfur analogue of an epoxide or aziridine. They are also known as thiiranes, olefin sulfides, thioalkylene oxides, and thiacyclopropanes. The parent episulfide is thiirane. Most preparations of episulfides utilize a two-step method, converting an olefin to an epoxide before its conversion to the episulfide using either thiocyanate or thiourea. Common uses of episulfides in both academic and industrial settings most often involve their use as monomers in polymerization reactions.

The thiourethane materials are obtained by polymerization of isocyanate compounds and thiol compounds. Isocyanate compounds were classified as aromatic compounds, aliphatic compounds, and alicyclic compounds. Examples of Aromatic Isocyanate Compounds are: 2,4-Toluylendiisocyanat, 1,5-Naphthalenediisocyanate, 4,4'-Diphenylmethane-diisocyanate and 4,4'-Diphenylsulfonediisocyanate. Examples of Aliphatic Isocyanate Compounds are: Hexamethylene diisocyanate, Octamethylene diisocyanate, Bis(isocyanatoethyl)sulfide, Bis(isocyanatoethyl)disulfide and m-Xylylenediisocyanate. Examples of Alicyclic Isocyanate Compounds are: Isophoronediisocyanate, 4,4'-Diisocyanatodicyclohexylmethane, 1,3-Bis(isocyanatomethyl)cyclohexane and 2,5(6)-Bis(isocyanatemethyl)bicyclo-[2.2.1]-heptane. Thiol compounds were classified as aromatic thiol compounds, aliphatic and alicyclic thiol compounds. Examples of Aromatic Thiol Compounds are: 1,3-Dimercaptobenzene, 1,3,5-Trimercaptobenzene and Bis(mercaptophenyl)sulfide. Examples of Aliphatic and Alicyclic Thiol Compounds are: Pentaerythritol Tetra(3-mercaptopropionate), Pentaerythritol Tetra(2-mercaptoacetate), 4-Mercaptomethy-1,8-dimercapt-3,6-dithiaoctane, 5,7-Dimercaptomethyl-1,11-dimercapto-3,6-trithiaundecane, Bis(mercaptoethyl)sulfide and 2,5-Bis(mercaptomethyl)-1,4-dithiane.

As a polymerization catalyst of the thiourethane-based materials, an organic amine and an organic metal compound are used. Furthermore, internal mold release agents, UV absorbers, light stabilizers, antioxidants, chain extenders, crosslinking agents, anti-coloring agents, dyeing agents, and fillers are used as additive agents.

As raw materials of high-index plastic lenses, thiourethane and episulfide based materials are widely used commercially from Mitsui Chemicals and Essilor. For example, MR-8™, MR-10™, MR-174™ and Thin & Lite 1.74.

Any lens-forming materials can be used in the invention. Lens forming materials that are suitable in the fabrication of contact lenses are illustrated by numerous issued US patents and familiar to those skilled in the art. Preferred lens-forming materials are capable of forming hydrogels. A lens-forming material can comprises at least one member selected from the group consisting of a hydrophilic monomer, a hydrophobic monomer, a macromer, a prepolymer, a crosslinking agent with molecular weight less than 1000 Daltons, and a mixture thereof. A lens-forming material can further include other components, such as an initiator (e.g., a photoinitiator or a thermal initiator), a visibility tinting agent, UV-blocking agent, photosensitizers, and the like.

Any actinically crosslinkable prepolymers can be used in the invention. Examples of actinically crosslinkable prepolymers include, but are not limited to, a water-soluble crosslinkable prepolymer described in U.S. Pat. Nos. 5,508,317, 5,583,163, 6,303,687, 5,849,841, 6,479,587, 5,712,356, 5,665,840, 6,492,478, 6,165,408, 6,221,303 and 6,472,489 and in U.S. Patent Application Publication Nos. 2004/0082680 A1 and 2005/0113549 A1 (herein incorporated by reference in their entireties) and actinically-crosslinkable silicone-containing prepolymers described in U.S. Pat. Nos. 6,039,913, 7,091,283, 7,268,189, 7,238,750, 7,521,519, 8,404,783, 8,003,710, 8,524,800, 8,071,658 and 8,071,703. (incorporated herein by references in their entireties).

The invention, in another respect, relates to a method for producing a contact lens, comprising: the steps of:

(1) providing a contact lens mold, wherein the mold comprising a first mold half having a first mold and a second mold half having a second mold surface, wherein the first mold half and the second mold half are configured to receive each other such that a cavity is formed between the first mold surface and the second mold surface, wherein the cavity defines the shape of a contact lens to be molded, wherein at least one of the mold halves is made from a sulfur containing polymer having a refraction index greater than 1.5, (2) introducing a lens-forming composition into the cavity formed by the first and second molding surfaces, material, wherein the lens-forming material is crosslinkable and/or polymerizable by actinic radiation or thermal energy;

(3) crosslinking/polymerizing the lens-forming material in the mold to form a lens having a polymer matrix;

(4) opening the mold and removing the formed contact lens from the mold.

The previous disclosure will enable one having ordinary skill in the art to practice the invention. In order to better enable the reader to understand specific embodiments and the advantages thereof, reference to the following non-limiting examples is suggested. However, the following examples should not be read to limit the scope of the invention.

EXAMPLES

Mold Samples Prepared by Single Point Diamond Turning

Molds are made by inserting a 18 mm diameter by 7 mm thick insert of CR-39 UV400, Tribrid, MR-8, Thin&Lite 1.67, MR-10, Thin&Lite 1.74 and MR-174 into a brass housing and securing it with epoxy. Once the insert was securely positioned the mold was produced utilizing single point diamond turning on an Optoform 80 lathe manufactured by Precitech Inc. Lathing conditions were as follows: 4500 RPM spindle speed, 5 micron depth of cut with a 6.5 mm/min federate. All molds were produced using contour diamond tool inserts.

Dimension Stability of Mold Test Method:

Radius of the part such as CR-39 or other materials was measured using FISBA interferometer before the immersion test. The DI water immersion test was carried out by placing individual CR-39 UV400 concave part in a I-CHEM glass jar. The entire assembly was placed inside a 40° C. oven for 7 days. After immersion test, concave part was removed from the glass jar and air dried, the part was allowed to stay in room temperature condition for at least 2 hours prior to mold radius measurement. After the immersion test, the concave parts were removed from the glass jar and air dried. Before and after the immersion test, mold radius was measured using FISBA interferometer (The model used was a FS 10M produced by the Fisba Optik corporation). Initial mold radius was 8.8 mm for all the concave part. These test conditions are to simulate the mold washing & rinsing conditions. Lightstream molds are reused, they are washed, rinsed & dried. The 40° C. was the temperature of the water.

Table 1 compares dimension stability of molds made from CR-39 UV400, Tribrid, MR-8, Thin&Lite 1.67, MR-10, Thin&Lite 1.74 and MR-174. The results indicate that molds made from a sulfur containing polymer having a refraction index greater than 1.5 such as Tribrid, MR-8, Thin&Lite 1.67, MR-10, Thin&Lite 1.74 and MR-174 have a better dimension stability, relative to a mold made from CR-39 UV400 (made from a diallyl diglycol carbonate polymer).

TABLE 1

| Mold Substrate | Supplier | Refraction index | DR (mm) |
|---|---|---|---|
| CR-39 UV400 | PPG | 1.50 | −0.065 |
| Tribrid | PPG | 1.60 | 0.005 |
| MR-8 | Mitsui chemical | 1.60 | 0.004 |
| Thin&Lite 1.67 | Essilor | 1.67 | 0.023 |
| MR-10 | Mitsui chemical | 1.67 | 0.005 |
| Thin&Lite 1.74 | Essilor | 1.74 | 0.024 |
| MR-174 | Mitsui chemical | 1.74 | −0.006 |

Change in radius, DR is defined as: DR = $R_{after} - R_{before}$

What we claim is:

1. A mold for making a contact lens, comprising a first mold half having a first mold surface in contact with a silicone containing lens forming composition and a second mold half having a second mold surface in contact with the silicone containing lens-forming composition, wherein the first mold half and the second mold half are configured to receive each other such that a cavity is formed between the first mold surface and the second mold surface, wherein the cavity defines the shape of a contact lens to be molded, wherein the silicone containing lens forming composition is polymerizable and/or crosslinkable by actinic radiation or thermal energy, wherein at least one of the mold halves is made from a sulfur containing polymer having a refraction index greater than 1.5, wherein the sulfur containing polymer is thiourethane or episulfide.

2. The mold for making a contact lens according to claim 1, wherein the thiourethane or episulfide having a refraction index greater than 1.6.

3. The mold for making a contact lens according to claim 1, wherein thiourethane or episulfide having a refraction index greater than 1.7.

4. The mold for making a contact lens according to claim 1, wherein the sulfur containing polymer is episulfide.

5. The mold for making a contact lens according to claim 1, wherein the sulfur containing polymer is thiourethane.

6. The mold for making a contact lens according to claim 1, wherein the mold is prepared by single point diamond turning.

7. A method for producing a contact lens, comprising: the steps of:
(1) providing a contact lens mold, wherein the mold comprising a first mold half having a first mold and a second mold half having a second mold surface, wherein the first mold half and the second mold half are configured to receive each other such that a cavity is formed between the first mold surface and the second mold surface, wherein the cavity defines the shape of a contact lens to be molded, wherein at least one of the mold halves is made from a sulfur containing polymer having a refraction index greater than 1.5, wherein the sulfur containing polymer is thiourethane or episulfide,
(2) introducing a silicone containing lens-forming composition into the cavity formed by the first and second molding surfaces, material, wherein the silicone containing lens-forming material is crosslinkable and/or polymerizable by actinic radiation or thermal energy;
(3) crosslinking/polymerizing the silicone containing lens-forming material in the mold to form a lens having a polymer matrix;
(4) opening the mold and removing the formed contact lens from the mold.

8. The method for making a contact lens according to claim 7, wherein the thiourethane or episulfide having a refraction index greater than 1.6.

9. The method for making a contact lens according to claim 7, wherein the thiourethane or episulfide having a refraction index greater than 1.7.

10. The method for making a contact lens according to claim 7, wherein the mold is prepared by single point diamond turning.

* * * * *